United States Patent
Hepkin et al.

(10) Patent No.: US 9,342,336 B2
(45) Date of Patent: *May 17, 2016

(54) MEMORY PAGE DE-DUPLICATION IN A COMPUTER SYSTEM THAT INCLUDES A PLURALITY OF VIRTUAL MACHINES

(71) Applicant: INTERNATIONAL BUSINESS MACHINES CORPORATION, Armonk, NY (US)

(72) Inventors: David A. Hepkin, Austin, TX (US); Stuart Z. Jacobs, Lakeville, MN (US); Bruce Mealey, Austin, TX (US); Naresh Nayar, Rochester, MN (US); Wade B. Ouren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 463 days.

This patent is subject to a terminal disclaimer.

(21) Appl. No.: 13/832,530

(22) Filed: Mar. 15, 2013

(65) Prior Publication Data

US 2014/0281118 A1  Sep. 18, 2014

Related U.S. Application Data

(63) Continuation of application No. 13/803,742, filed on Mar. 14, 2013.

(51) Int. Cl.
   *G06F 9/455*  (2006.01)
(52) U.S. Cl.
   CPC ........ *G06F 9/45533* (2013.01); *G06F 9/45558* (2013.01); *G06F 2009/45583* (2013.01)

(58) Field of Classification Search
   CPC ............ G06F 9/45533; G06F 9/45558; G06F 2009/45583
   See application file for complete search history.

(56) References Cited

U.S. PATENT DOCUMENTS

| | | | | |
|---|---|---|---|---|
| 6,049,853 | A * | 4/2000 | Kingsbury et al. | 711/147 |
| 7,500,048 | B1 * | 3/2009 | Venkitachalam et al. | 711/6 |
| 8,159,890 | B2 | 4/2012 | Fujiwara | |
| 2007/0016755 | A1 * | 1/2007 | Pratt | 711/207 |
| 2009/0287901 | A1 * | 11/2009 | Abali et al. | 711/206 |
| 2010/0070715 | A1 | 3/2010 | Waltermann et al. | |
| 2012/0117301 | A1 * | 5/2012 | Wingard | 711/6 |
| 2013/0159596 | A1 * | 6/2013 | Van De Ven et al. | 711/6 |
| 2013/0275973 | A1 * | 10/2013 | Greenfield et al. | 718/1 |

OTHER PUBLICATIONS

"Method for General Sharing of Data in Hybrid Memory Organization", IBM Technical Disclosure Bulletin, vol. 25, No. 5, Oct. 1982, pp. 2606-2620. (NN82102606_H.pdf and NN82102606_I.pdf).*

* cited by examiner

*Primary Examiner* — Charles Rones
*Assistant Examiner* — Tian-Pong Chang
(74) *Attorney, Agent, or Firm* — Edward J. Lenart; Feb Cabrasawan; Kennedy Lenart Spraggins LLP

(57) ABSTRACT

Memory page de-duplication in a computer system that includes a plurality of virtual machine partitions managed by a hypervisor, where each virtual machine is assigned a different dedicated memory partition, may include: identifying, by the hypervisor, a plurality of identical memory pages in memory of one or more dedicated memory partitions; assigning, by the hypervisor, one of the identical memory pages as a master page; mapping, for each virtual machine having an identical memory page, each of the identical memory pages to the master page; and directing, by the hypervisor, reads of the memory page to the master page.

10 Claims, 6 Drawing Sheets

MEMORY PAGE DE-DUPLICATION IN A COMPUTER SYSTEM THAT INCLUDES A PLURALITY OF VIRTUAL MACHINES

CROSS-REFERENCE TO RELATED APPLICATION

This application is a continuation application of and claims priority from U.S. patent application Ser. No. 13/803,742, filed on Mar. 14, 2013.

BACKGROUND OF THE INVENTION

1. Field of the Invention

The field of the invention is data processing, or, more specifically, methods, apparatus, and products for memory page de-duplication in a computer system that includes a plurality of virtual machines.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

A single computer system today may, for example, support execution of a multiple virtual machines. A virtual machine is a logical partition of a machine that is usually different from the target machine upon which it is being simulated. Physical characteristics of a computing platform—computer processors, computer memory, I/O adapters, and the like—are abstracted from the perspective of an operating system and other software applications that execute within the virtual machine.

In some computing systems, many virtual machines may be assigned a portion of dedicated memory at the time of establishing the virtual machine. Any one of the virtual machines may, at any given time, have one or more memory pages that are identical to memory pages of other virtual machines. In fact, in some instances, a single virtual machine may have multiple, identical pages of memory. In such an environment, however, cache memories utilized by the virtual machines may have multiple separate instances of the identical pages in the cache. Further, because separate virtual machines may be accessing identical pages at different addresses, there is a higher probability of a cache miss for that page which results in additional loading of the page into cache even if an identical instance of that page is already in the cache.

SUMMARY OF THE INVENTION

Methods, apparatus, and products for memory page de-duplication in a computer system are disclosed. Such a computer system may include a plurality of virtual machine partitions managed by a hypervisor, where each virtual machine is assigned a different dedicated memory partition. Memory page de-duplication in accordance with various embodiments of the present invention may include: identifying, by the hypervisor, a plurality of identical memory pages in memory of one or more dedicated memory partitions; assigning, by the hypervisor, one of the identical memory pages as a master page, including mapping, for each virtual machine having an identical memory page, each of the identical memory pages to the master page; and directing, by the hypervisor, reads of the memory page to the master page. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
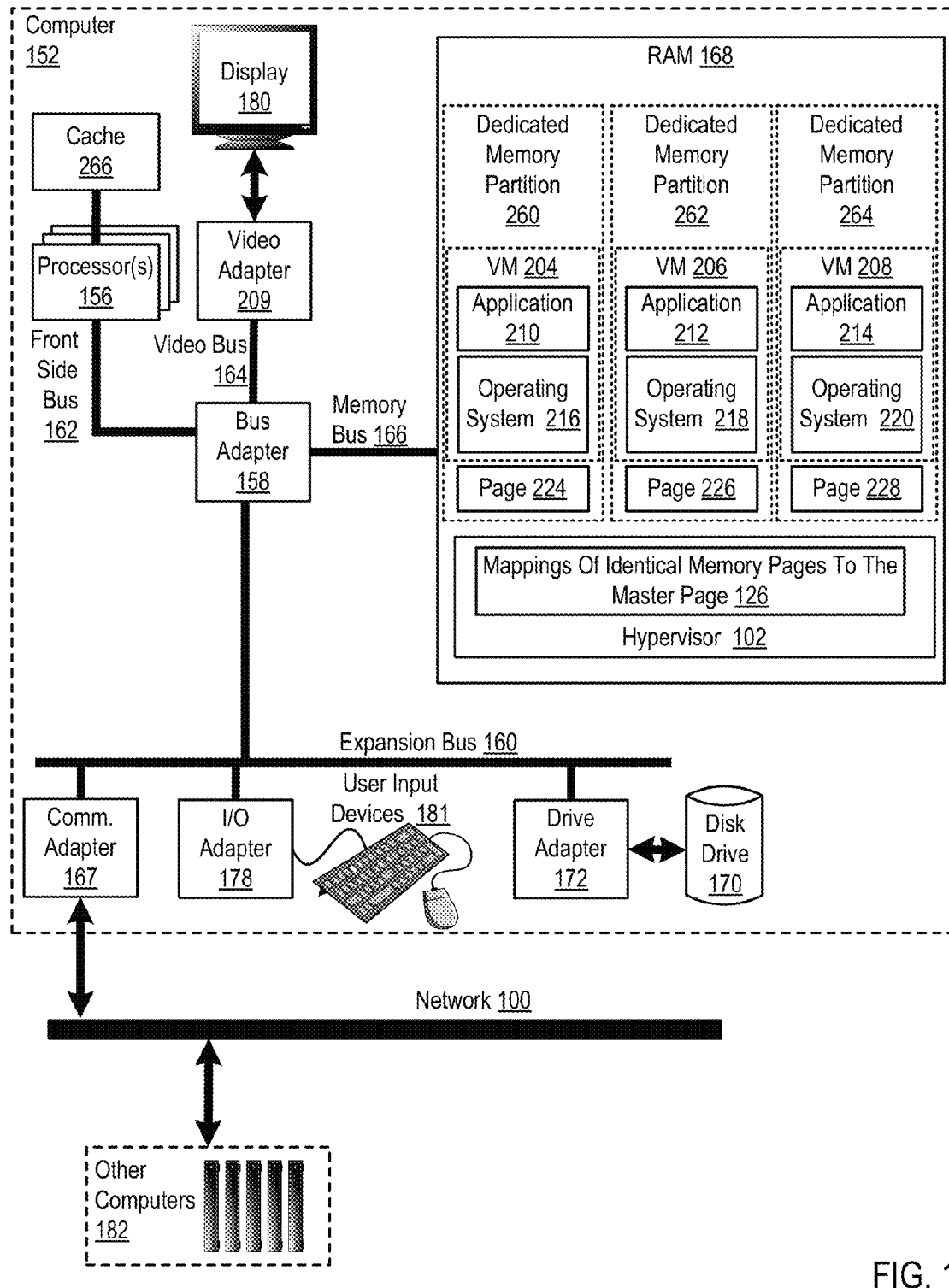
FIG. 1 sets forth a block diagram of a system for memory page de-duplication in a computer system that includes a plurality of virtual machines according to embodiments of the present invention.

Exemplary methods, apparatus, and products for memory page de-duplication in a computer system that includes a plurality of virtual machines in accordance with the present invention are described with reference to the accompanying drawings, beginning with FIG. 1. FIG. 1 sets forth a block diagram of a system for memory page de-duplication in a computer system that includes a plurality of virtual machines according to embodiments of the present invention.

The system of FIG. 1 includes automated computing machinery comprising an exemplary computer (152) useful in memory page de-duplication in a computer system that includes a plurality of virtual machines according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a hypervisor (102), a module of automated computing machinery that may comprise any combination of computer program instructions, computer hardware, and so on. The hypervisor (102) in the example of FIG. 1 maintains a virtualized environment that includes a number of virtual machines (204, 206, 208). A hypervisor, also called virtual machine monitor (VMM), is a module of automated computing machinery that performs software and hardware platform-virtualization in order to enable multiple operating systems (216, 218, 220) to run on a host computer concurrently. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

Each virtual machine (204, 206, 208) in the example of FIG. 1 may execute at least one application (210, 212, 214) and an operating system (216, 218, 220). Operating systems useful in virtual machines that are configured for memory page de-duplication according to embodiments of the present invention include UNIX™, Linux™ Microsoft XP™ Microsoft Windows 7™ AIX™ IBM's i5/OS™ and others as will occur to those of skill in the art.

Each virtual machine (204, 206, 208) in the example of FIG. 1 is also assigned, by the hypervisor, a dedicated memory partition (260, 262, 264). A dedicated memory partition as the term is used in this specification refers to a portion of memory assigned to a virtual machine for use only by the virtual machine. In the example of FIG. 1, each of the virtual machines stores a page (224) of memory (also referred to as a 'memory page' or 'page') in the virtual machine's dedicated memory partition (260, 262, 264). Each the pages (260, 262, 264) in the example of FIG. 1 is identical.

The hypervisor (102) in the example of FIG. 1 operates for memory page de-duplication by identifying identical memory pages in memory of one or more dedicated memory partitions and assigning one of the identical memory pages as a master page. A 'master page' as the term is used here is a page to which read accesses will be directed by all virtual machines having an identical page. The hypervisor, in assigning a master page, map, for each virtual machine, each of the identical memory pages to the master page. Such a mapping (126) provides to each virtual machine having an identical page within the virtual machine's dedicated memory partition, a pointer, index, address or other identifier of the master memory page. Once the identical memory pages are mapped to the master page, each virtual machine (204, 206, 214) having an identical memory page mapped to the master page may direct reads of the identical memory page to the master page. In this way, cache misses may be reduced and fewer identical instances of identical pages may exist in the cache (266).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for memory page de-duplication in a computer system that includes a plurality of virtual machines according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for memory page de-duplication in a computer system that includes a plurality of virtual machines according to embodiments of the present invention include modems for wired dial-up communications, Ethernet (IEEE 802.3) adapters for wired data communications, and 802.11 adapters for wireless data communications.

The arrangement of computers, networks, virtual machines, hypervisor, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
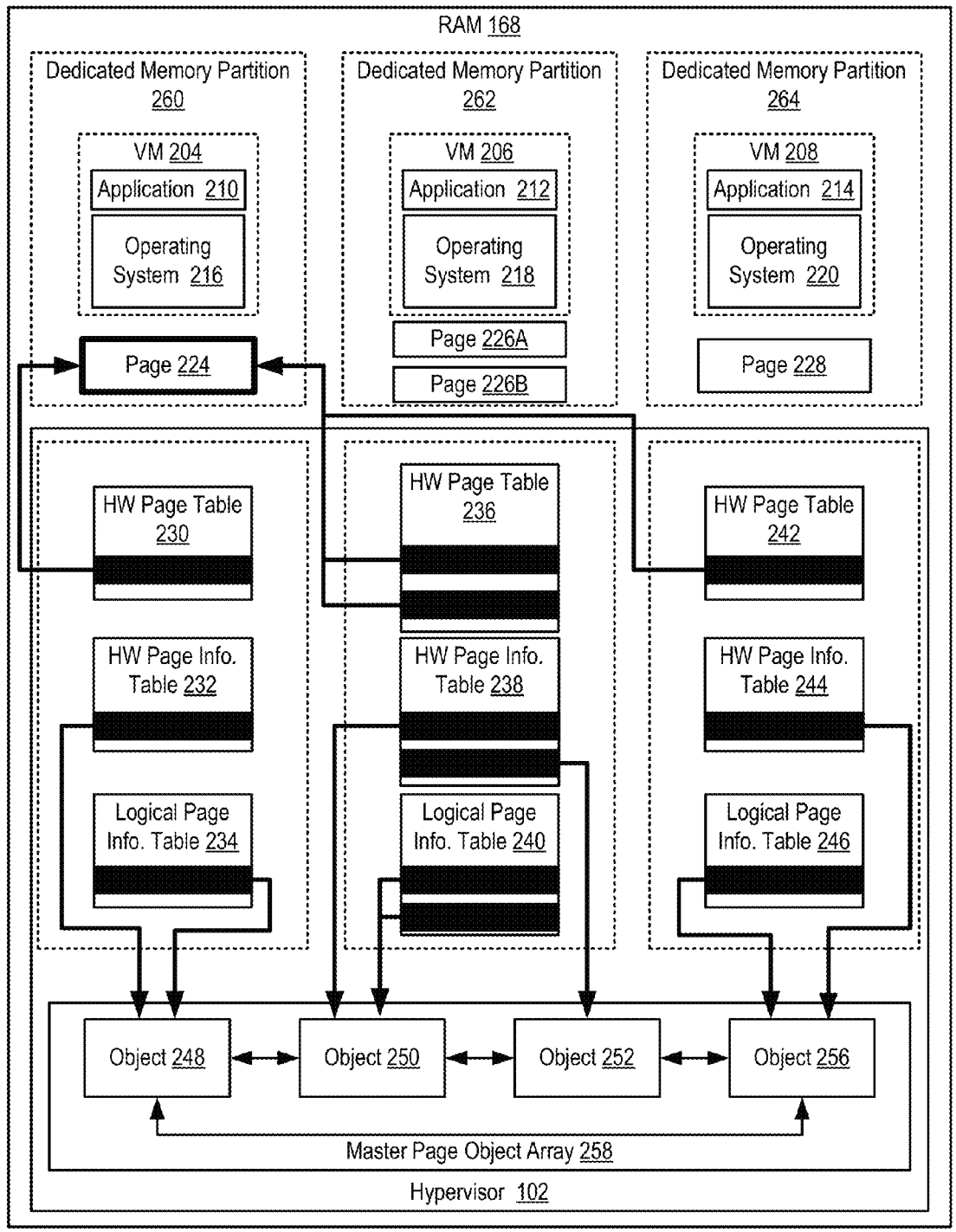
FIG. 2 sets forth a block diagram of memory including various data structures useful for memory page de-duplication in a computer system that includes a plurality of virtual machines according to embodiments of the present invention.

For further explanation, FIG. 2 sets forth a block diagram of memory including various data structures useful for memory page de-duplication in a computer system that includes a plurality of virtual machines according to embodiments of the present invention. The example memory of FIG. 2, in the form of RAM (168), is similar to that depicted in the example of FIG. 1 in that the RAM (168) of FIG. 2 includes a hypervisor (102) and several virtual machines (204, 206, 208), each of which is assigned a dedicated memory partition (260, 262, 264) and each of which is executing an application (210, 212, 214).

Each virtual machine (260, 262, 264) in the example of FIG. 2 is associated with hardware page table (230, 236, 242). A hardware page table includes entries for pages, where each entry includes a physical address of the page in memory. In the example of FIG. 2, the hypervisor (102) may carry out memory page de-duplication by identifying identical memory pages (224, 226A, 226B, 228) in memory of one or more dedicated memory partitions (260, 262, 264). Virtual machine (206), in the example of FIG. 2, includes two separate identical pages (226A, 226B) within the virtual machine's dedicated memory partition. Each page in each virtual machine's dedicated memory is associated with an entry in the virtual machine's hardware page table (230, 236, 242). Readers of skill in the art will recognize, however, that a page in a dedicated memory partition need not include an entry in the hardware page table. Instead, the hypervisor may maintain a logical page information table (234) that includes a logical address of each page, regardless of whether the page has an entry in the hardware page table.

Once, the hypervisor (102) identifies the identical memory pages (224, 226A, 226B, 228), the hypervisor may assign one of the identical memory pages as a master page. In this example, the hypervisor (102) assigns page (224) as the master page and maps each of the identical memory pages to the master page. Mapping a page to the master page may include storing a pointer or the like in the hardware page table entry for the page. The hypervisor (102) may also maintain, for each virtual machine, a hardware page information table (232, 238, 244) with each entry associated with an entry of a hardware page table of the virtual machine. Entries of the hardware page table represent a hardware address of a page for the virtual machine. Each entry of the hardware page information table may include an indication as to whether the hardware address of the page is mapped to a master page. Additionally, the hypervisor may indicate in an entry of each of the logical page information tables (234, 240, 246) associated with the identical page, that the page is mapped to a master page.

The hypervisor (102) of FIG. 2 may also maintain, for each master page, an array (258) of objects. Each different object (248, 250, 252, 256) is associated with a different virtual machine and a different page mapped to the master page. Each object may also includes one or more of:
  a virtual machine identifier that identifies the virtual machine having a page mapped to the master page;
  a logical page number comprising an index into the logical page information table and utilized by the hypervisor for logical to physical address translation;
  a hardware page table index into an entry of the virtual machine's hardware page table at the entry representing the hardware address of the page mapped to the master page;
  a forward pointer that points to a subsequent object in the array of objects for the master page;
  a back pointer that points to a previous object in the array of objects for the master mage; and a pointer to the memory address of the master page.

The forward and back pointers of the objects enable the objects to form a linked-list style data structure.

Once the mappings are established, the virtual machines direct reads to the identical pages (224, 226A, 226B, 228) to the master page (224).

Upon a write to the master page by a virtual machine, however, the hypervisor (102) may remove the mapping of the virtual machine's identical page (224, 226A, 226B, 228) to the master page (224), remove, from the array (102) for the master page, an object (248, 250, 252, 256) associated with the virtual machine and update the forward and back pointers of one or more remaining objects of the array. Consider, for example, that virtual machine (206), writes to the master page (224). In such an example, the hypervisor may remove the mapping of the virtual machine's identical page (226A), remove the object (250), and update the forward and back pointers of the objects (248) and (252).

Consider, another example in which the virtual machine (204) writes to the master page. In this example, when the hypervisor (102) removes the mapping of the identical page (224) to the master page, the mappings of identical pages from the other virtual machines are no longer valid. That is, in instances in which the master page is a page stored in a dedicated memory partition of the virtual machine writing to the master page, all other mappings must be updated. In such a case, the hypervisor may assign another of the identical pages to be the master, map the pages to the newly assigned master, and update all tables accordingly.

Figure 3:
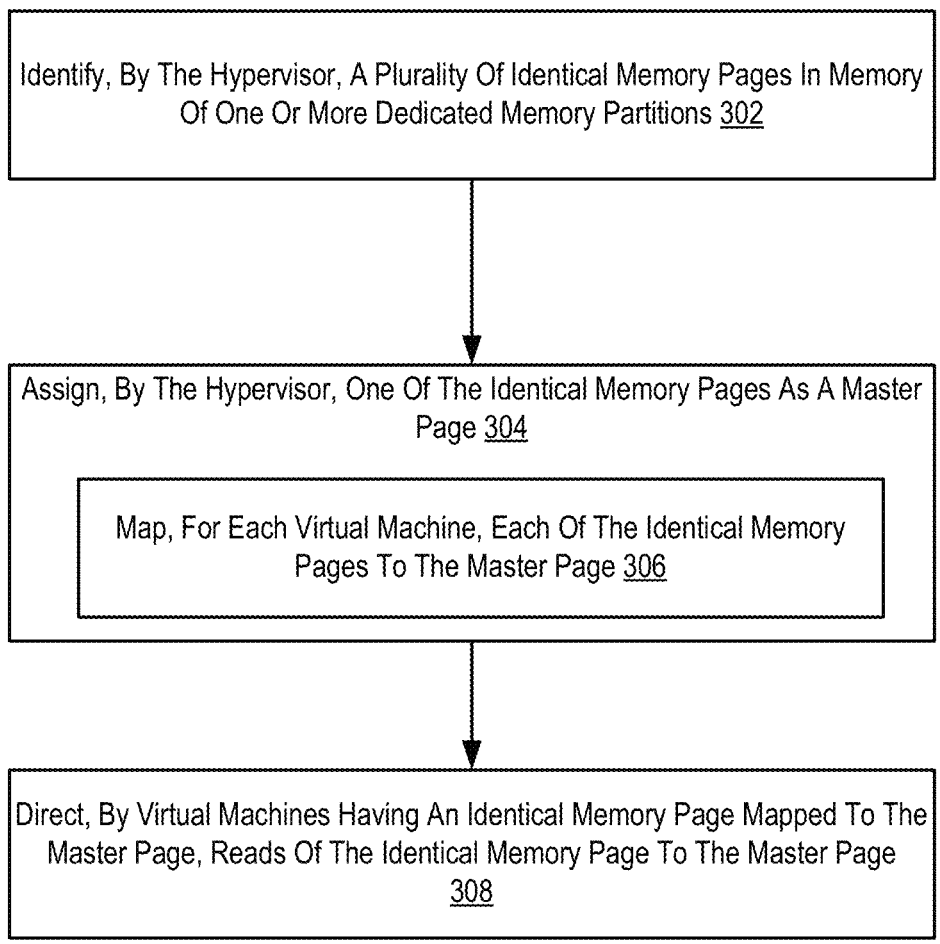
FIG. 3 sets forth a flow chart illustrating an exemplary method for memory page de-duplication in a computer system that includes a plurality of virtual machines according to embodiments of the present invention.

For further explanation, FIG. 3 sets forth a flow chart illustrating an exemplary method for memory page de-duplication in a computer system that includes a plurality of virtual machines according to embodiments of the present invention. The method of FIG. 3 includes identifying (302), by the hypervisor, a plurality of identical memory pages in memory of one or more dedicated memory partitions. The hypervisor may identify identical memory pages in various ways, including, for example, by applying a hashing algorithm to pages and comparing the resulting hash values. If the hash values of multiple pages match, the hypervisor may identify the pages as identical pages.

The method of FIG. 3 also includes assigning (304), by the hypervisor, one of the identical memory pages as a master page. In the method of FIG. 3, assigning (304) one of the identical memory pages as the master page includes mapping (306), for each virtual machine, each of the identical memory pages to the master page. Mapping (306) each of the identical memory pages to the master page may include update hardware page table entries relating to the memory page to point to the address of the master page.

The method of FIG. 3 also includes directing (308), by virtual machines having an identical memory page mapped to the master page, reads of the identical memory page to the master page. Because the hardware page tables are updated to reflect the mappings, the virtual machines direct reads to the master page in a typical virtual to physical address translation using the hardware page table.

Figure 4:
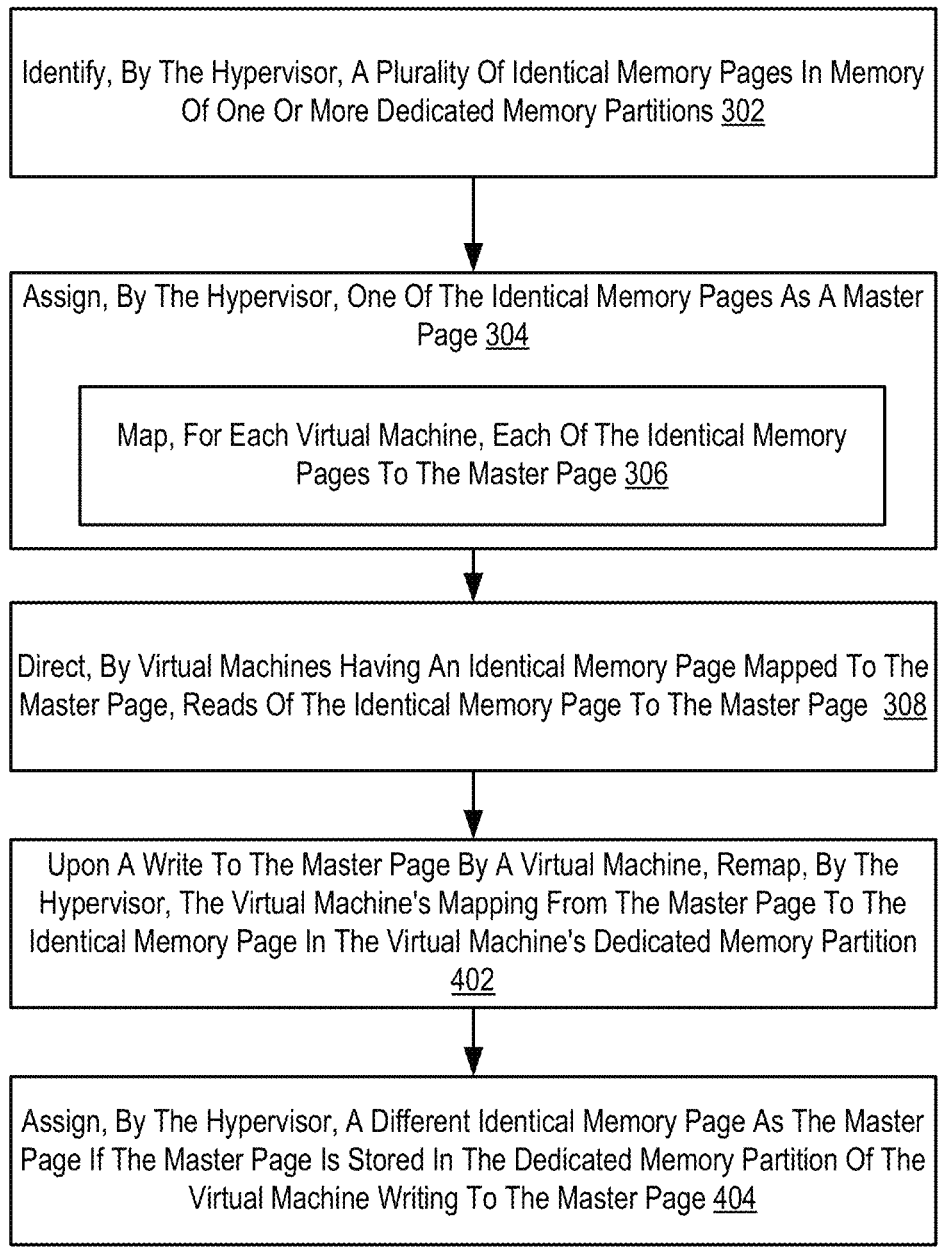
FIG. 4 sets forth a flow chart illustrating a further exemplary method for memory page de-duplication in a computer system that includes a plurality of virtual machines according to embodiments of the present invention.

For further explanation, FIG. 4 sets forth a flow chart illustrating a further exemplary method for memory page de-duplication in a computer system that includes a plurality of virtual machines according to embodiments of the present invention. The method of FIG. 4 is similar to the method of FIG. 3 in that the method of FIG. 4 also includes identifying (302), by the hypervisor, a plurality of identical memory pages in memory of one or more dedicated memory partitions; assigning (304), by the hypervisor, one of the identical memory pages as a master page; mapping (306), for each virtual machine, each of the identical memory pages to the master page; and directing (308), by virtual machines having an identical memory page mapped to the master page, reads of the identical memory page to the master page.

The method of FIG. 4 differs from the method of FIG. 3, however, the method of FIG. 4 also includes, upon a write to the master page by a virtual machine, remapping (402), by the hypervisor, the virtual machine's mapping from the master page to the identical memory page in the virtual machine's dedicated memory partition. Remapping (402) the virtual machine's mapping from the master page to the identical memory page in the virtual machine's dedicated memory partition may include restoring the original memory address of the identical memory page in the hardware page table of the virtual machine.

The method of FIG. 4 also includes assigning (404), by the hypervisor, a different identical memory page as the master page if the master page is stored in the dedicated memory partition of the virtual machine writing to the master page. Assigning (404) a different identical memory page as the master page may also include updating the mappings of the other identical memory pages to point to the newly assigned master page.

Figure 5:
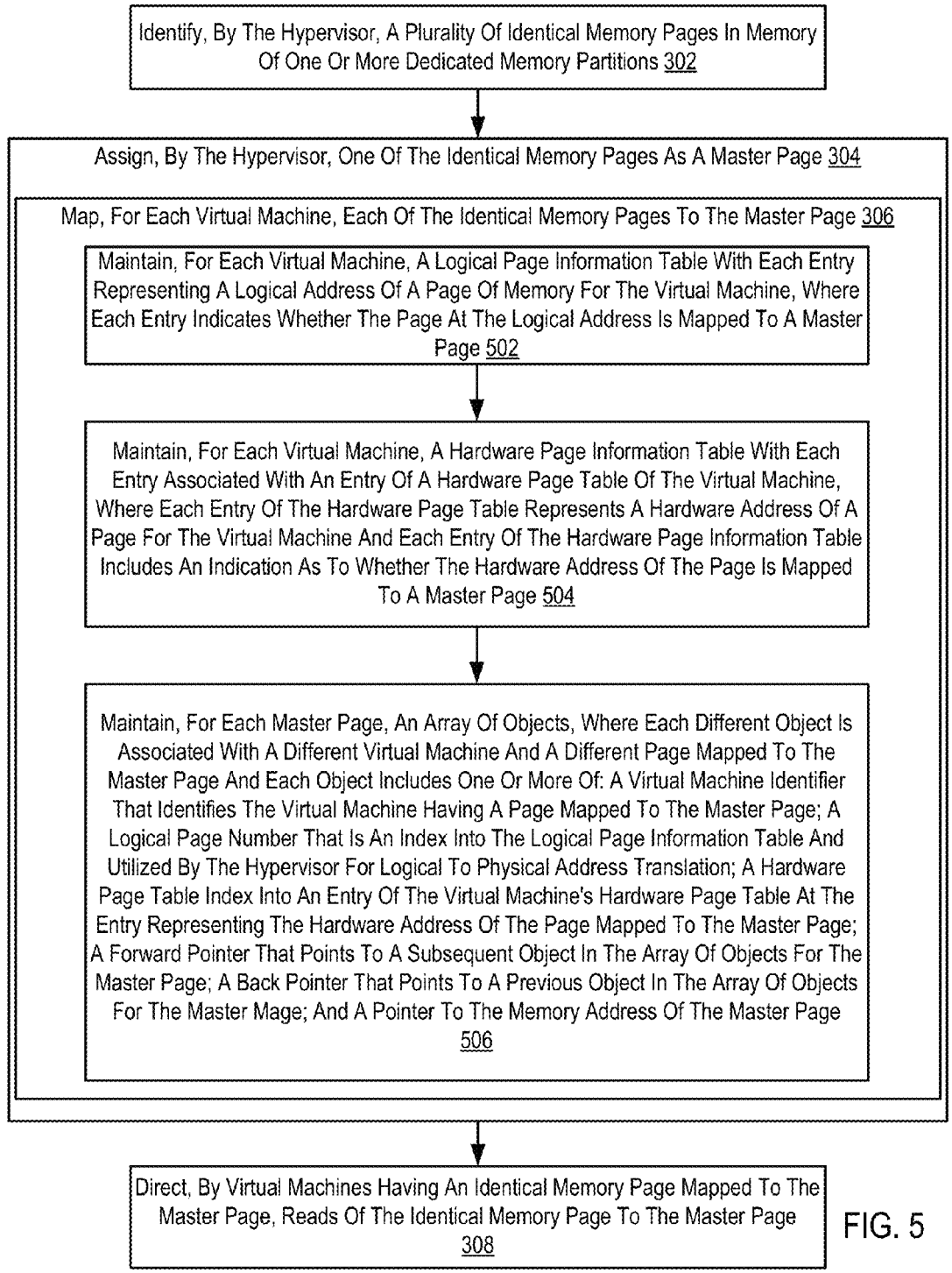
FIG. 5 sets forth a flow chart illustrating a further exemplary method for memory page de-duplication in a computer system that includes a plurality of virtual machines according to embodiments of the present invention.

For further explanation, FIG. 5 sets forth a flow chart illustrating a further exemplary method for memory page de-duplication in a computer system that includes a plurality of virtual machines according to embodiments of the present invention. The method of FIG. 5 is similar to the method of FIG. 3 in that the method of FIG. 5 also includes identifying (302), by the hypervisor, a plurality of identical memory pages in memory of one or more dedicated memory partitions; assigning (304), by the hypervisor, one of the identical memory pages as a master page; mapping (306), for each virtual machine, each of the identical memory pages to the master page; and directing (308), by virtual machines having an identical memory page mapped to the master page, reads of the identical memory page to the master page.

The method of FIG. 5 differs from the method of FIG. 3, however, in that in the method of FIG. 5, mapping (306) each of the identical memory pages to the master page includes maintaining (502), for each virtual machine, a logical page information table with each entry representing a logical address of a page of memory for the virtual machine. Each entry indicates whether the page at the logical address is mapped to a master page.

Mapping (306) each of the identical memory pages to the master page in the method of FIG. 5 also includes maintaining (504), for each virtual machine, a hardware page information table with each entry associated with an entry of a hardware page table of the virtual machine. Each entry of the hardware page table represents a hardware address of a page for the virtual machine and each entry of the hardware page information table includes an indication as to whether the hardware address of the page is mapped to a master page.

In the method of FIG. 5, mapping (306) each of the identical memory pages to the master page also includes maintaining, for each master page, an array of objects. Each different object is associated with a different virtual machine and a different page mapped to the master page. Each object includes one or more of: a virtual machine identifier that identifies the virtual machine having a page mapped to the master page; a logical page number comprising an index into the logical page information table and utilized by the hypervisor for logical to physical address translation; a hardware page table index into an entry of the virtual machine's hardware page table at the entry representing the hardware address of the page mapped to the master page; a forward pointer that points to a subsequent object in the array of objects for the master page; a back pointer that points to a previous object in the array of objects for the master mage; and a pointer to the memory address of the master page.

In the method of FIG. 5, each separate entry of a virtual machine's hardware page information table that includes an indication that the hardware address of a page is mapped to the master page also includes a pointer to a separate one of the objects associated with the virtual machine in the array for the master page. Also, every entry of a virtual machine's logical page information table that represents a logical address of a page mapped to the master page includes a pointer to a first object associated with the virtual machine in the array for the master page.

Figure 6:
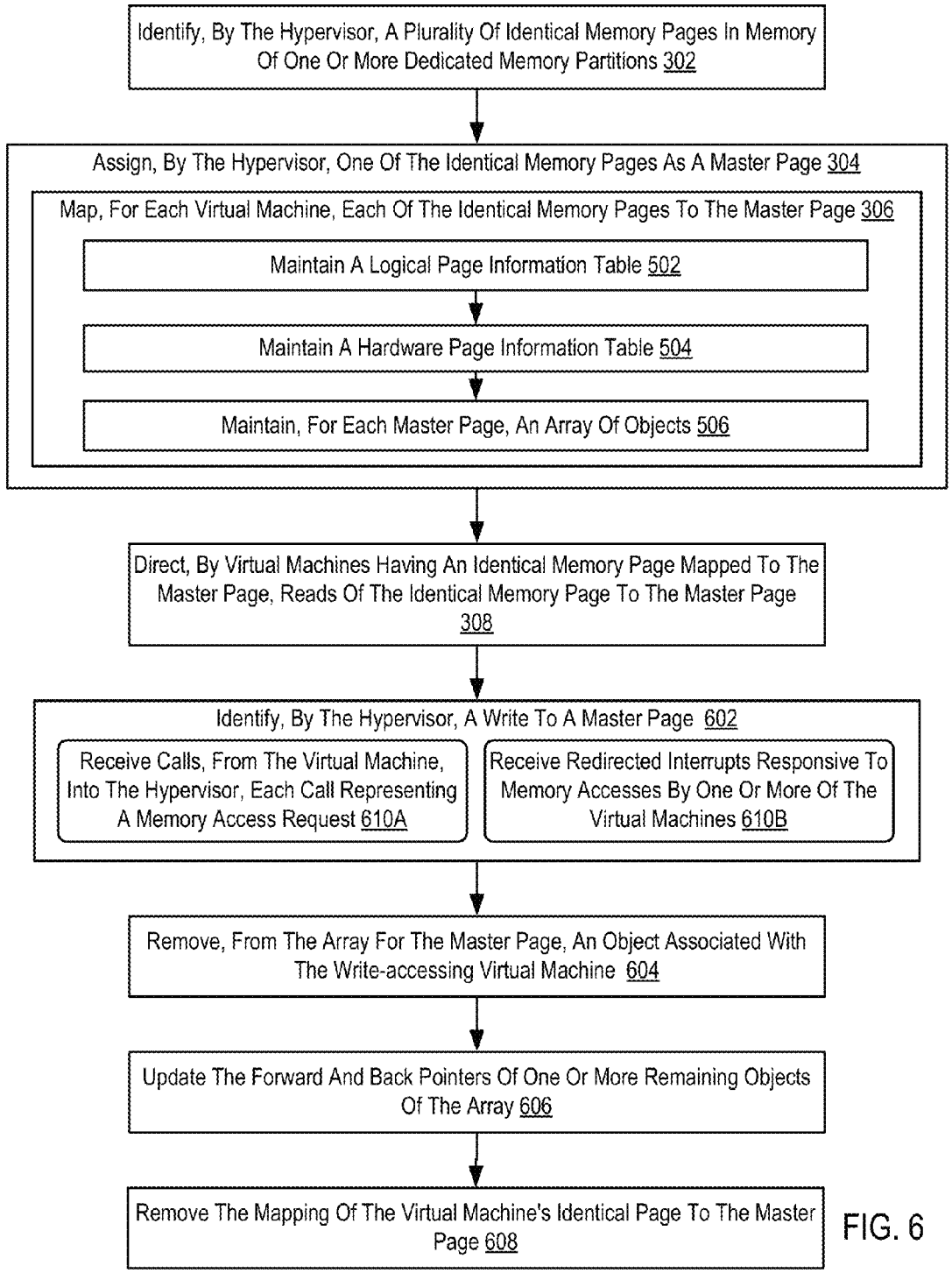
FIG. 6 sets forth a flow chart illustrating a further exemplary method for memory page de-duplication in a computer system that includes a plurality of virtual machines according to embodiments of the present invention.

For further explanation, FIG. 6 sets forth a flow chart illustrating a further exemplary method for memory page de-duplication in a computer system that includes a plurality of virtual machines according to embodiments of the present invention. The method of FIG. 6 is similar to the method of FIG. 5 in that the method of FIG. 6 also includes identifying (302) identical memory pages in memory of one or more dedicated memory partitions; assigning (304), by the hypervisor, one of the identical memory pages as a master page; mapping (306), for each virtual machine, each of the identical memory pages to the master page; and directing (308), by virtual machines having an identical memory page mapped to the master page, reads of the identical memory page to the master page. In the method of FIG. 6—also like the method of FIG. 5—mapping (306) the identical memory pages to the master page includes maintaining (502) a logical page information table (502), maintaining a hardware page information table (504), and maintaining an array of objects for each master page.

The method of FIG. 6 differs from the method of FIG. 5, however, in that the method of FIG. 6 includes identifying (602), by the hypervisor, a write to a master page. Identifying (602) a write to a master page may be carried out by one of: receiving (610A) calls, from the virtual machine, into the hypervisor, with each call representing a memory access request or receiving (610B) redirected interrupts responsive to memory accesses by one or more of the virtual machines.

Upon a write to the master page by a write-accessing virtual machine, the method of FIG. 6 continues by removing (604), from the array for the master page, an object associated with the write-accessing virtual machine, updating (606) the forward and back pointers of one or more remaining objects of the array, and removing (608) the mapping of the virtual machine's identical memory page to the master page.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of memory page de-duplication in a computer system comprising a plurality of virtual machine partitions managed by a hypervisor, wherein each virtual machine is assigned a different dedicated memory partition, the method comprising:

managing a plurality of virtual machine partitions by a hypervisor, each virtual machine being assigned a different dedicated memory partition;

identifying, by the hypervisor, a plurality of identical memory pages in memory of one or more dedicated memory partitions;

assigning, by the hypervisor, one of the identical memory pages as a master page, including mapping, for each virtual machine, each of the identical memory pages to the master page, wherein mapping, for each virtual machine, each of the identical memory pages to the master page comprises:

maintaining, for each virtual machine, a logical page information table with each entry representing a logical address of a page of memory for the virtual machine, wherein each entry indicates whether the page at the logical address is mapped to the master page; and in response to a write to the master page by a virtual machine whose assigned dedicated memory partition includes the master page, performing operations including:

assigning, by the hypervisor, a different identical memory page as a new master page; and remapping, for each virtual machine, each of the identical memory pages to the new master page; and directing, by virtual machines having an identical memory page mapped to the master page, reads of the identical memory page to the master page.

2. The method of claim 1, further comprising:

upon a write to the master page by a virtual machine, remapping, by the hypervisor, the virtual machine's mapping from the master page to the identical memory page in the virtual machine's dedicated memory partition.

3. The method of claim 1, wherein mapping, for each virtual machine, each of the identical memory pages to the master page further comprises:

maintaining, for each virtual machine, a hardware page information table with each entry associated with an entry of a hardware page table of the virtual machine, each entry of the hardware page table representing a hardware address of a page for the virtual machine and each entry of the hardware page information table including an indication as to whether the hardware address of the page is mapped to a master page; and maintaining, for each master page, an array of objects, wherein each different object is associated with a different virtual machine and a different page mapped to the master page and each object includes:

a virtual machine identifier that identifies the virtual machine having a page mapped to the master page;

a forward pointer that points to a subsequent object in the array of objects for the master page;

a back pointer that points to a previous object in the array of objects for the master mage; and a pointer to the memory address of the master page;

each separate entry of a virtual machine's hardware page information table including an indication that the hardware address of a page is mapped to the master page further comprises a pointer to a separate one of the objects associated with the virtual machine in the array for the master page; and every entry of a virtual machine's logical page information table that represents a logical address of a page mapped to the master page includes a pointer to a first object associated with the virtual machine in the array for the master page.

4. The method of claim 3, further comprising:

upon a write to the master page by a write-accessing virtual machine:

removing, from the array for the master page, an object associated with the write-accessing virtual machine;

updating the forward and back pointers of one or more remaining objects of the array; and removing the mapping of the virtual machine's identical memory page to the master page.

5. The method of claim 4, further comprising identifying, by the hypervisor, a write to a master page, including:

receiving calls, from the virtual machine, into the hypervisor, each call representing a memory access request.

6. The method of claim 1, wherein mapping, for each virtual machine each of the identical memory pages to the master page further comprises:

maintaining, for each master page, an array of objects, wherein each different object is associated with a different virtual machine and a different page mapped to the master page and each object includes a logical page number comprising an index into the logical page information table and utilized by the hypervisor for logical to physical address translation.

7. The method of claim 1, wherein mapping, for each virtual machine each of the identical memory pages to the master page further comprises:

maintaining, for each master page, an array of objects, wherein each different object is associated with a different virtual machine and a different page mapped to the master page and each object includes a hardware page table index into an entry of the virtual machine's hardware page table at the entry representing the hardware address of the page mapped to the master page.

8. The method of claim 1 wherein identifying, the hypervisor, a plurality of identical memory pages in memory of one or more dedicated memory partitions includes:

applying a hashing algorithm to a plurality of memory pages of the one or more dedicated memory partitions to create respective hash values;

comparing the respective hash values;

in response to one or more of the respective hash values matching, identifying the corresponding memory pages as the identical memory pages.

9. The method of claim 3, wherein in response to a write to the master page by a virtual machine whose assigned dedicated memory partition includes the master page, further comprises an operation including updating the hardware page information table, the hardware page table, and the logical page information table.

10. The method of claim 4 further comprising identifying, by the hypervisor, a write to a master page, including receiving redirected interrupts responsive to memory accesses by one or more of the virtual machines.

* * * * *